United States Patent
Sackett

(10) Patent No.: US 11,169,100 B2
(45) Date of Patent: Nov. 9, 2021

(54) PORTABLE, HAND HELD ALUMINUM ALLOY XRF ANALYZER AND METHOD

(71) Applicant: SciAps, Inc., Woburn, MA (US)

(72) Inventor: Donald W. Sackett, Bedford, MA (US)

(73) Assignee: SciAps, Inc., Woburn, MA (US)

( * ) Notice: Subject to any disclaimer, the term of this patent is extended or adjusted under 35 U.S.C. 154(b) by 218 days.

(21) Appl. No.: 15/957,448

(22) Filed: Apr. 19, 2018

(65) Prior Publication Data
US 2019/0302040 A1    Oct. 3, 2019

Related U.S. Application Data

(60) Provisional application No. 62/651,408, filed on Apr. 2, 2018.

(51) Int. Cl.
*G01N 23/223* (2006.01)

(52) U.S. Cl.
CPC ..... *G01N 23/223* (2013.01); *G01N 2223/076* (2013.01); *G01N 2223/301* (2013.01)

(58) Field of Classification Search
CPC .......... G01N 9/24; G01N 21/62; G01N 21/64; G01N 21/95; G01N 21/95684; G01N 23/00; G01N 23/22; G01N 23/221; G01N 23/223; G01N 23/225; G01N 23/2255; G01N 23/2257; G01N 2021/625; G01N 2021/634; G01N 2021/6417; G01N 2021/6423; G01N 2021/8405; G01N 2291/02; G01N 2291/023; G01N 2291/0234; G01N 2291/02809; G01N 2223/00; G01N 2223/07; G01N 2223/076; G01N 2223/10;

(Continued)

(56) References Cited

U.S. PATENT DOCUMENTS

| 4,016,419 A | * | 4/1977 | Kotani | G01N 23/223 378/48 |
| 6,512,810 B1 | | 1/2003 | Haszler et al. | |

(Continued)

OTHER PUBLICATIONS

Written Opinion of the International Searching Authority; PCT Application No. PCT/US13/55706, dated Jan. 29, 2014, (fifteen (15) pgs (unnumbered)).

*Primary Examiner* — Anastasia Midkiff
(74) *Attorney, Agent, or Firm* — Iandiorio Teska & Coleman, LLP

(57) ABSTRACT

A portable hand held XRF analyzer and method wherein an X-ray source directs X-rays to a sample and a detector detects photons emitted by the sample. A controller subsystem controlling the X-ray source an I/O section and is responsive to the detector and I/O section. The controller subsystem is configured to present to the user, via the I/O section, a choice to invoke an aluminum alloy algorithm test. An aluminum alloy algorithm test is invoked if the operator chooses the aluminum alloy algorithm test. Then, the X-ray source is operated at a predetermined voltage level and predetermined current level and the detector output is analyzed to determine elements and their concentrations present in the sample. Preferably, if the analysis fails to detect one or more common aluminum alloy elements present in the sample and/or fails to specify a particular aluminum alloy, then the X-ray source is automatically operated at a higher voltage and lower current level to repeat the analysis step.

16 Claims, 4 Drawing Sheets

(58) Field of Classification Search
CPC ..... G01N 2223/101; G01N 2223/1016; G01N 2223/20; G01N 2223/30; G01N 2223/301–3; G01N 2223/3037; G01N 2223/306; G01N 2223/60; G01N 2223/615; G01N 2223/652; G01T 1/16; H05G 1/00; H05G 1/02; H05G 1/04; H05G 1/06; H05G 1/08; H05G 1/26; H05G 1/30; H05G 1/32; H05G 1/34; H05G 1/46; H01J 37/00; H01J 37/16; H01J 2237/02; H01J 2237/06; H01J 2237/061; H01J 2237/22; H01J 2237/245; H01J 2237/24592; H01J 2237/248; H01J 2237/2485; A61B 6/46; A61B 6/461; A61B 6/465

See application file for complete search history.

(56) References Cited

U.S. PATENT DOCUMENTS

| | | | |
|---|---|---|---|
| 6,801,595 B2 | 10/2004 | Grodzins et al. | |
| 6,850,592 B2 | 2/2005 | Schramm et al. | |
| 7,233,643 B2 | 6/2007 | Sipila et al. | |
| 7,403,281 B2 | 7/2008 | Carron et al. | |
| 7,430,273 B2 | 9/2008 | Yellepeddi | |
| 7,430,274 B2 | 9/2008 | Connors et al. | |
| 7,448,801 B2 | 11/2008 | Oettinger et al. | |
| 7,448,802 B2 | 11/2008 | Oettinger et al. | |
| 7,899,153 B2 | 3/2011 | Dugas et al. | |
| 7,999,928 B2 | 8/2011 | Beckstead et al. | |
| 8,355,126 B2 | 1/2013 | Goulter et al. | |
| 9,176,080 B2 | 11/2015 | Drummy | |
| 9,689,815 B2 | 6/2017 | Jones | |
| 2008/0192889 A1* | 8/2008 | Rohde | G01N 23/223 378/45 |
| 2008/0192897 A1* | 8/2008 | Piorek | G01N 23/223 378/98.8 |
| 2008/0205592 A1* | 8/2008 | Connors | G01N 23/223 378/45 |
| 2008/0253509 A1* | 10/2008 | Schlomka | G01V 5/0025 378/19 |
| 2009/0001262 A1 | 1/2009 | Visser et al. | |
| 2009/0163369 A1 | 6/2009 | Treado et al. | |
| 2009/0262889 A1* | 10/2009 | Dugas | G01N 23/223 378/45 |
| 2010/0080351 A1* | 4/2010 | Hession-Kunz | G01N 23/223 378/45 |
| 2010/0171951 A1 | 7/2010 | Misra et al. | |
| 2011/0080577 A1 | 4/2011 | Nelson et al. | |
| 2012/0034686 A1 | 2/2012 | Berlin et al. | |
| 2013/0079918 A1* | 3/2013 | Spencer | G01N 23/02 700/223 |
| 2014/0204377 A1 | 7/2014 | Day et al. | |
| 2014/0254757 A1* | 9/2014 | Oh | A61B 6/4241 378/62 |
| 2017/0014868 A1 | 1/2017 | Garcia, Jr. et al. | |

\* cited by examiner

PORTABLE, HAND HELD ALUMINUM ALLOY XRF ANALYZER AND METHOD

RELATED APPLICATIONS

This application claims benefit of and priority to U.S. Provisional Application Ser. No. 62/651,408 filed Apr. 2, 2018, under 35 U.S.C. §§ 119, 120, 363, 365, and 37 C.F.R. § 1.55 and § 1.78, and is incorporated herein by this reference.

FIELD OF THE INVENTION

This invention relates to X-ray fluorescence (XRF) analyzers.

BACKGROUND OF THE INVENTION

In XRF systems, an X-ray source (e.g., tube) emits X-rays delivered to a sample. Fluoresced photons emitted by the sample are then detected to and analyzed to ascertain the elemental concentrations in the sample.

XRF analyzers generally require a robust, fairly expensive x-ray tube capable of being driven at a low voltage (e.g., 10 kV), a high current e.g., (200-500 uA) with little or no primary beam filtering (a "low pass" filter, i.e. 50 um Al) in order to allow a large number of low-energy X-rays (e.g., 10 keV and less) to strike the sample. This setting of tube voltage, current and filter selection is optimal to detect some elements (e.g., aluminum, silicon, magnesium, phosphorus and/or sulfur). The tube is also driven at a higher voltage levels (e.g., 40-50 kV), with lower current (e.g., 20-30 uA) and a thicker primary beam filter (a "high pass" filter, i.e. 1 mm silver) to detect other elements (e.g., the transition metals such as titanium, chromium, iron, nickel and copper, the heavy metals such as lead and gold, and transition metals that require high x-ray tube voltages (ideally 50 kV) including cadmium, silver, tin, and/or antimony). This method is often called a "dual" or "multi-beam" operation. It is not possible to drive the tube at both the high voltage (e.g., 40-50 kV), high current (e.g., 200-500 uA) and minimal primary beam filtering (e.g., 50 uA Al or blank) in order to be optimal in both the low voltage and high voltage domain of operation. This is because in this case the detector would be saturated with X-rays striking it, making it perform too poorly to be useful for the measurement of alloys or other materials. See U.S. Pat. Nos. 7,430,274; 7,899,153 and 2017/014868 all incorporated herein by this reference.

SUMMARY OF THE INVENTION

When the X-ray tube is driven at higher voltages (e.g., 40 kV), the higher energy X-rays may scatter off certain materials (e.g., aluminum alloys and magnesium alloys). Driving the X-ray tube at higher current levels produces more X-rays resulting in a faster more precise test. But, too high current levels (for a given tube voltage) will result in X-rays which overload the detector.

So, to detect the transition and heavy metals, the X-ray tube is typically driven at a high voltage, lower current setting to detect any transition and heavy metals and also to detect, via X-ray scattering in a given spectral region, whether or not the sample is some kind of a lower-density alloy such as an aluminum or magnesium alloy. This test is fairly fast (e.g., 2 to 3 seconds) but cannot be used to detect the specific type of aluminum alloy in the sample (e.g., alloy series or a specific alloy within a series because the high voltage test does not measure the low atomic number elements such as Si, Al and Mg which can make up as much as 99.5% of an aluminum alloy If a high rate of X-ray scattering in a given spectral region is detected, the X-ray source may then be driven at a lower voltage and higher current level in order to detect, for example, the elements like Mg, Al, Si present in the alloy and to categorize the sample as a specific type of aluminum or magnesium alloy. In most commercially available portable XRF devices, this test takes longer (e.g., 15-60 seconds) because the less energetic X-rays, particularly from magnesium, are strongly absorbed in air, blocked by windows in the device, and/or for other reasons do not generate sufficient fluoresced photons.

Portable XRF devices were initially developed for non-aluminum alloys. This is because for non-aluminum alloys, usually 90-100% of the elements in the alloy could be measured in the first beam (high voltage, low current). Thus, the devices were setup to run optimally for the alloy groups that portable XRF worked best for. As the sensitivity of the devices to elements Mg, Si, and Al improved, they were modified to also analyze aluminum alloys. The main modification was the use of a second beam (low voltage, high current) to improve the measurements of critical elements such as Mg, Al and Si in aluminum alloys.

The current measurement strategy employed by every known portable XRF devices is to first test the material with a high voltage, low current beam for several seconds, since historically portable XRF devices were used on stainless, nickel, copper, and titanium alloys (all of which are ideal for this beam setting). If it is determined via the scattered X-rays that the alloy is an aluminum or magnesium alloy, then the device switches to the low voltage, high current beam setting. This is because accurate analysis of aluminum alloys requires the concentrations of Mg, Si and Al must, at a minimum, be determined.

In a preferred example of the subject invention, three important things were realized. First, if the X-ray device can measure the 11 elements Mg, Al, Si, Ti, V, Cr, Mn, Fe, Ni, Cu and Zn, then nearly 90% of all aluminum alloys encountered by users can be accurately identified. Second, it is possible to employ X-ray tube settings and a low pass primary beam filter to measure the above 11 elements very quickly and precisely in a single, optimized X-ray tube setting that does not overwhelm the detector. Finally it is realized that some users and operators know a priori what general type of samples are being analyzed especially in a given industry, for example, the scrap sorting, aluminum alloy production and fabrication industries or the aerospace industry where aluminum alloys are prevalent. Accordingly, the operator is now given a choice to enable a special algorithm whereby the analysis first operates the X-ray tube at a low voltage, high current (e.g., 10-11 kV, 300-500 µA), and low pass filter to detect, for example, aluminum, magnesium, silicon, copper, zinc, vanadium, chromium, manganese, iron, and/or nickel elements present in the sample. The tube voltage level of 10-11 kV is high enough, when combined with the low pass filter, to detect these common aluminum alloy elements but not so high as to flood and overwhelm the detector. A tube setting of high voltage and high current plus the low pass filter would overwhelm the detector. One aspect of the subject invention is the realization that there is a set of tube parameters that are ideally suited for analyzing aluminum and magnesium alloys very fast, with good precision. Specifically, in one example, operating the XRF device at a voltage setting between 10-11 kV and a high tube current (300-500 uA) plus the low pass filter yields fast, high precision measurements of key alloy elements Mg, Si, V, Cr, Mn, Fe, Cu, Ni, and Zn, but does not generate such high rates as to overwhelm the detector. Moreover, nearly every aluminum alloy can be correctly analyzed and identified with a single beam test using these parameters for faster results.

The tube high current level generates numerous X-rays to provide for a fast test (e.g., 1-2 seconds). If the analysis reveals the sample is an aluminum alloy that can be identified without a second beam measurement (more than 90% of tests meet this requirement), the algorithm stops the test after resolving the specific alloy (e.g., series and/or a specific alloy within the series). The result if a much faster test since there is then no need to run the high voltage, low current test.

Many aluminum alloys have overlapping specifications for some most elements, making a unique identification more difficult. In some cases, the elements measured in the low voltage beam have overlapping specifications, and the two alloys are only differentiated by other elements, typically lead (Pb), bismuth (Bi), silver (Ag) and/or tin (Sn). A good example is aluminum alloy 6061 and 6040. These alloys cannot usually be sorted by measuring only the elements with the low voltage beam. Alloy 6040 also contains Bi and Sn, while 6061 does not.

In this case, the result from the low-voltage beam would indicate the alloy can be either alloy. The algorithm then automatically adjusts the analyzer to the high-voltage beam settings (in this case 40 kV, 20-30 uA current, and high pass primary beam filter). These "beam 2" settings are ideal for measuring Pb, Bi, Sn, Ag and other possible alloying elements for these special cases. Alloys such as 6040 are rarely encountered, so in nearly all cases the analyzer will terminate the test after Beam 1.

In another case, the algorithm may determine that the key elements magnesium, silicon and aluminum are not present. Then the algorithm may automatically report that fact to the operator and, for example, recommend that the algorithm not be used, since the material being tested is not an aluminum or magnesium alloys, and therefore the assumption that the majority of elements can be analyzed in the low voltage, high current tube setting is likely invalid. In some examples, the algorithm may then automatically cease so that the analyzer can be operated as usual (e.g., a higher voltage, lower current level test optionally followed by a lower voltage, higher current level test).

In summary, the common practice is to operate the X-ray tube first at a high voltage, low current level setting and high pass primary filter to detect transition and heavy metals and scattering indicating the sample may be an aluminum alloy and then the X-ray tube is operated at a low voltage, high current level to analyze the alloy elements present and to report the specific alloy. In total, the testing time can be long (e.g., 10-60 seconds).

In contrast, the current aluminum alloy algorithm allows an operator who suspects the sample is an aluminum alloy to eliminate any test where the X-ray tube is operated at a higher voltage, lower current level and instead to more quickly (e.g., in 1 to 4 seconds) analyze an aluminum alloy using a low tube voltage of 10-11 kV, a high current level of 300-500 µA and a low pass primary filter (e.g., no filter material at all). In the vast majority of cases, this single test will be sufficient to determine the alloy type, series, and grade. Only when certain aluminum alloy elements are not detected (e.g., zirconium, lead, bismuth, tin) or when the first analysis fails to identify a specific alloy, is the X-ray tube then operated at the higher voltage, lower current level for a second test. This technique works well for many aluminum alloys as well as magnesium and zinc alloys.

Featured is a portable hand held XRF analyzer comprising an I/O section, an X-ray source for directing X-rays to a sample, a detector for detecting photons emitted by the sample, and a controller subsystem controlling the X-ray source and 110 section and responsive to the detector and I/O section. The controller subsystem is configured to present to the user via the I/O section a choice to invoke an aluminum alloy algorithm test, as well as one or more additional tests, to invoke the aluminum alloy algorithm test if the operator chooses the aluminum alloy algorithm test, to operate the X-ray source at a predetermined voltage level and predetermined current level, and to analyze the detector output to determine elements and their concentrations present in the sample.

In one example, the aluminum alloy algorithm test is configured to automatically set the predetermined voltage level at 10-11 kV and the predetermined current level at 300-500 µA. The controller subsystem may further be configured to operate the X-ray source at a higher voltage, lower current level if one or more common aluminum alloy elements are not detected. In one example, the higher voltage level may be 40-50 kV and the current low current level may be 10-30 µA. The controller subsystem may further be configured to present to the user on the I/O section a choice to operate the X-ray source at the higher voltage, lower current level.

The controller subsystem may further be configured, if the analysis fails to specify a particular aluminum alloy, to automatically operate the X-ray source at a higher voltage level and lower current level to detect one or more additional elements present in the sample in order to specify a particular aluminum alloy. In one example, the higher voltage level may be 40-50 kV and the lower current level may be 10-30 µA.

Also featured is an XRF analysis method comprising offering a user a choice to invoke an aluminum alloy algorithm test and one or more additional tests, invoking the aluminum alloy algorithm test in response to user input, operating the X-ray source at a predetermined voltage level and a predetermined current level to direct X-rays at a sample, detecting elements in the sample, and evaluating the detected elements present in the sample and reporting a specific aluminum alloy for the sample.

The method may further include operating the X-ray source at a higher voltage level if one or more common aluminum alloy elements are not detected. The method may further include, if a specific aluminum alloy cannot be identified, operating the X-ray source at a higher voltage level and lower current level to detect one or more additional elements present in the sample in order to specify the specific aluminum alloy.

One portable hand held XRF analyzer includes an I/O section, an X-ray source for directing X-rays to a sample, a detector for detecting photons emitted by the sample, and a controller subsystem controlling the X-ray source and I/O section and responsive to the detector and I/O section. The controller subsystem is configured to present to the user via the I/O section a choice to invoke an aluminum alloy algorithm test, invoke the aluminum alloy algorithm test if the operator chooses the aluminum alloy algorithm test, operate the X-ray source at a predetermined voltage level and predetermined current level, analyze the detector output to determine elements and their concentrations present in the sample, and only if the analysis fails to detect one or more common aluminum alloy elements present in the sample and/or fails to specify a particular aluminum alloy, then to operate the X-ray source at a higher voltage/lower current level and repeat the analysis step.

The controller subsystem may further be configured to present to the user on the I/O section one or more additional choices to invoke other tests.

Also featured is an XRF analysis method comprising offering a user a choice to invoke an aluminum alloy algorithm test, invoking the aluminum alloy algorithm test in response to user input, operating the X-ray source at a predetermined voltage level and a predetermined current level to direct X-rays at a sample, detecting elements in the sample, and analyzing the detected elements present in the sample only if the analysis fails to detect one or more common aluminum alloy elements present in the sample and/or fails to specify a particular aluminum alloy, then is the X-ray source operated at a higher voltage, lower current level.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
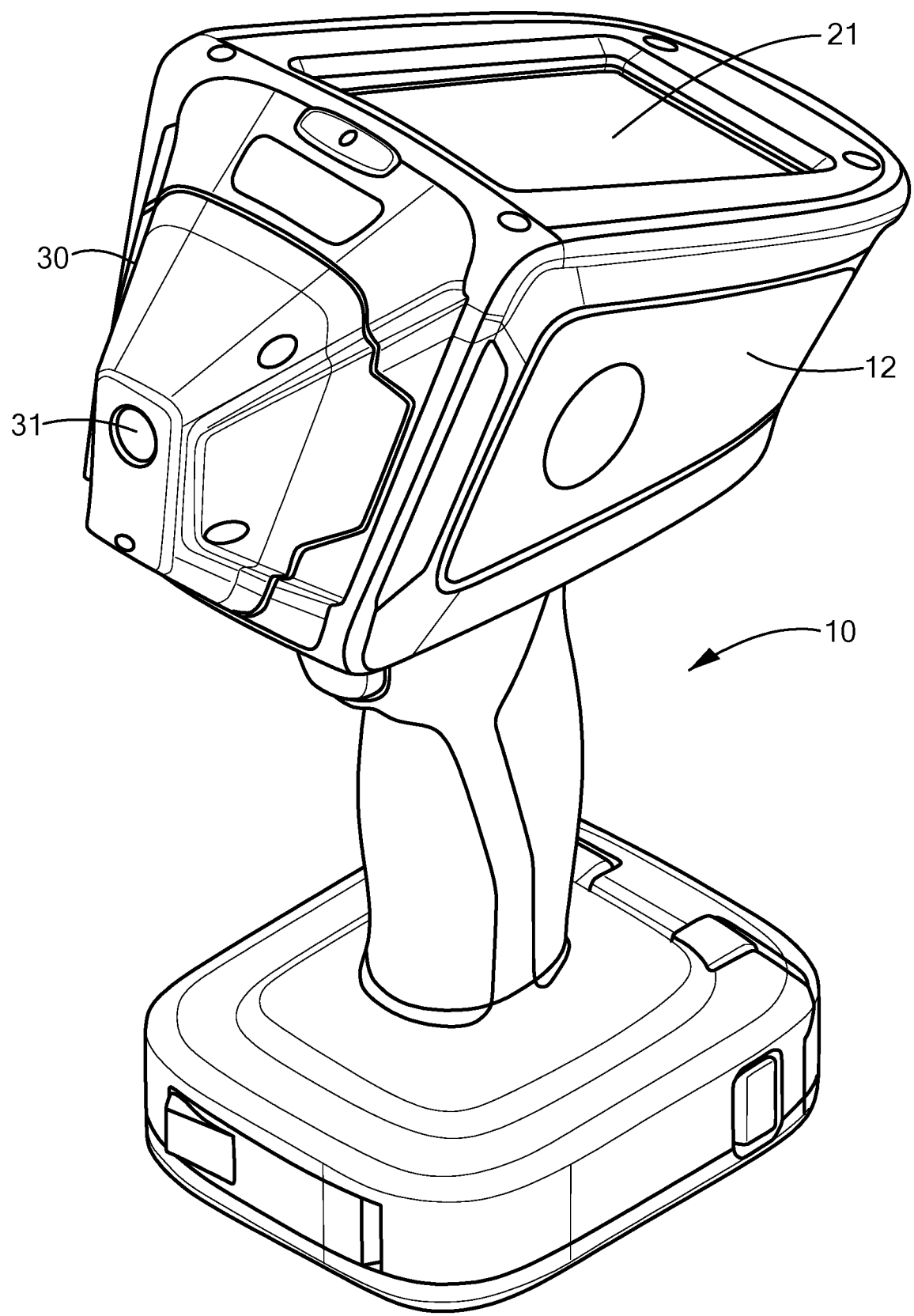
FIG. 1 is a schematic view showing an example of a hand held portable XRF analyzer in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
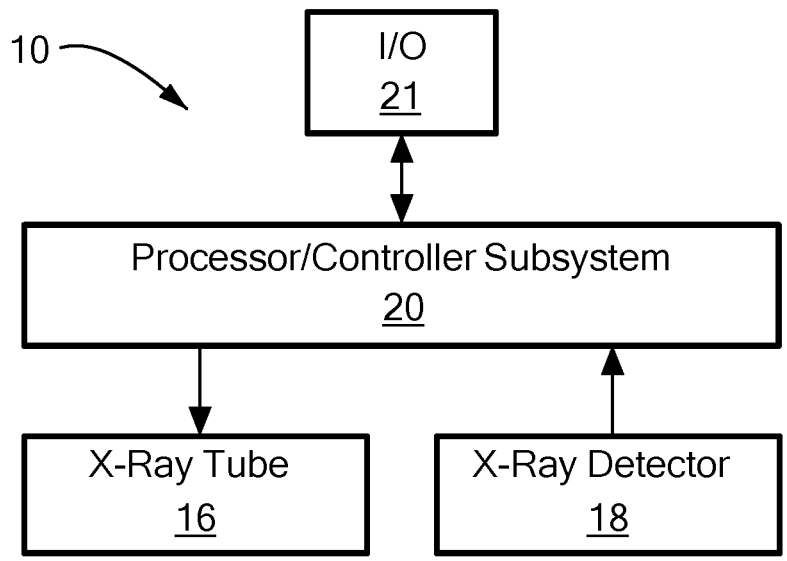
FIG. 2 is a block diagram showing the primary components associated with the hand held XRF analyzer of FIG. 1.

Hand held portable XRF analyzer 10, FIG. 1 includes I/O section 21 (e.g., a touch screen) and nose section 30 including window 31 through which X-rays pass to a sample to be analyzed and through which fluoresced photons pass from the sample into the analyzer. Inside housing 12 is X-ray tube 16, FIG. 2, X-ray detector 18, and controller subsystem 20. A filter wheel may also be included. See, for example, U.S. Pat. Nos. 7,430,027, 9,176,080 and 9,689,815 all incorporated herein by this reference. The filter wheel may be controlled by a processor/controller subsystem.

The X-ray detection subsystem 18 typically includes a silicon drift detector. Preferably, the X-ray tube is a miniature tube as set forth in Pat. Nos. 7,448,801 and 7,448,802 incorporated herein by this reference. The X-ray tube may be a component of a module including a power supply.

Figure 3:
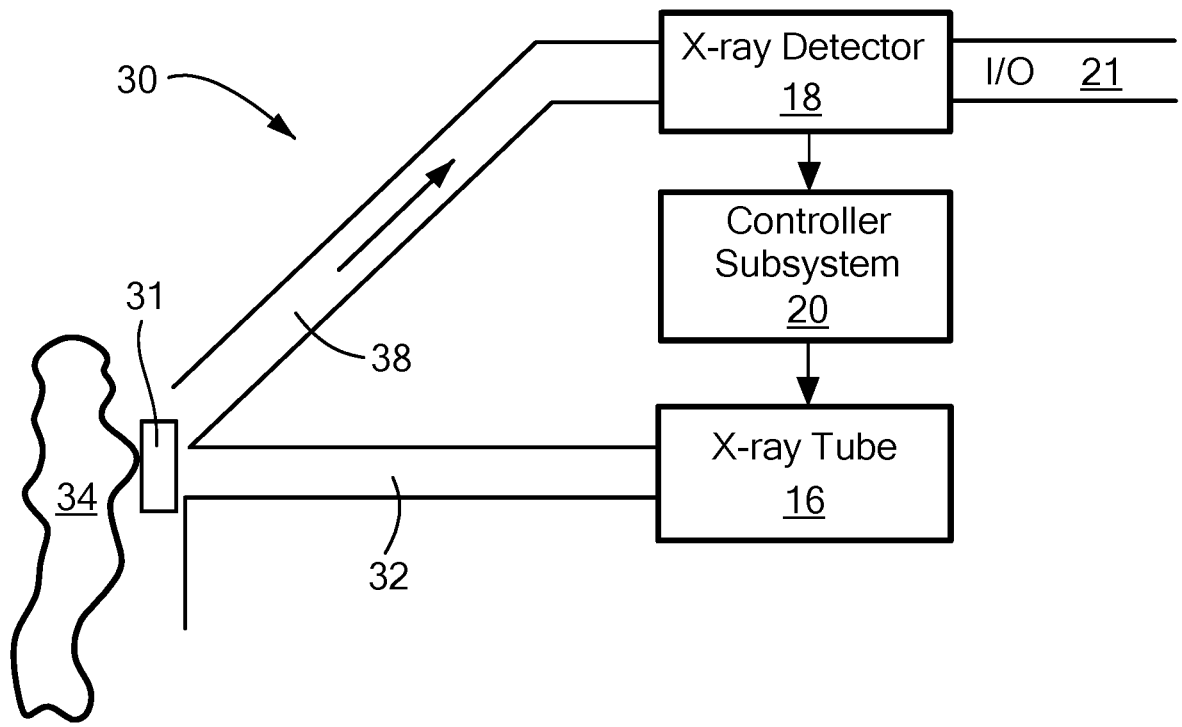
FIG. 3 is a view showing an example of an X-ray channel from the X-ray tube to the sample and the fluoresced photon channel from the sample to the X-ray detection subsystem.

FIG. 3 shows nose 30 of the hand held unit with a channel 32 for delivering X-rays to sample 34 and channel 38 for delivering fluoresced energy to the X-ray detector. The optical devices used in the various channels are not shown. Various mirrors, lens, fiber optic devices, and the like may be used.

Processor/controller subsystem 20 controls the operation of X-ray tube 16, filter wheel 31, and processes the output of X-ray detector 18 for the analysis performed and provides an output to the user typically via I/O section 21. The processor/controller subsystem may be distributed and include one or more microcontrollers, driver circuitry, and the various power supply circuitry as well as digital signal processors, microprocessors, memoires, and the like. Power supply and other circuitries are not shown but would be present in the analyzer. Preferably, the controller subsystem includes one or more memory devices with computer instructions stored therein which execute the algorithms disclosed herein.

Figure 4:
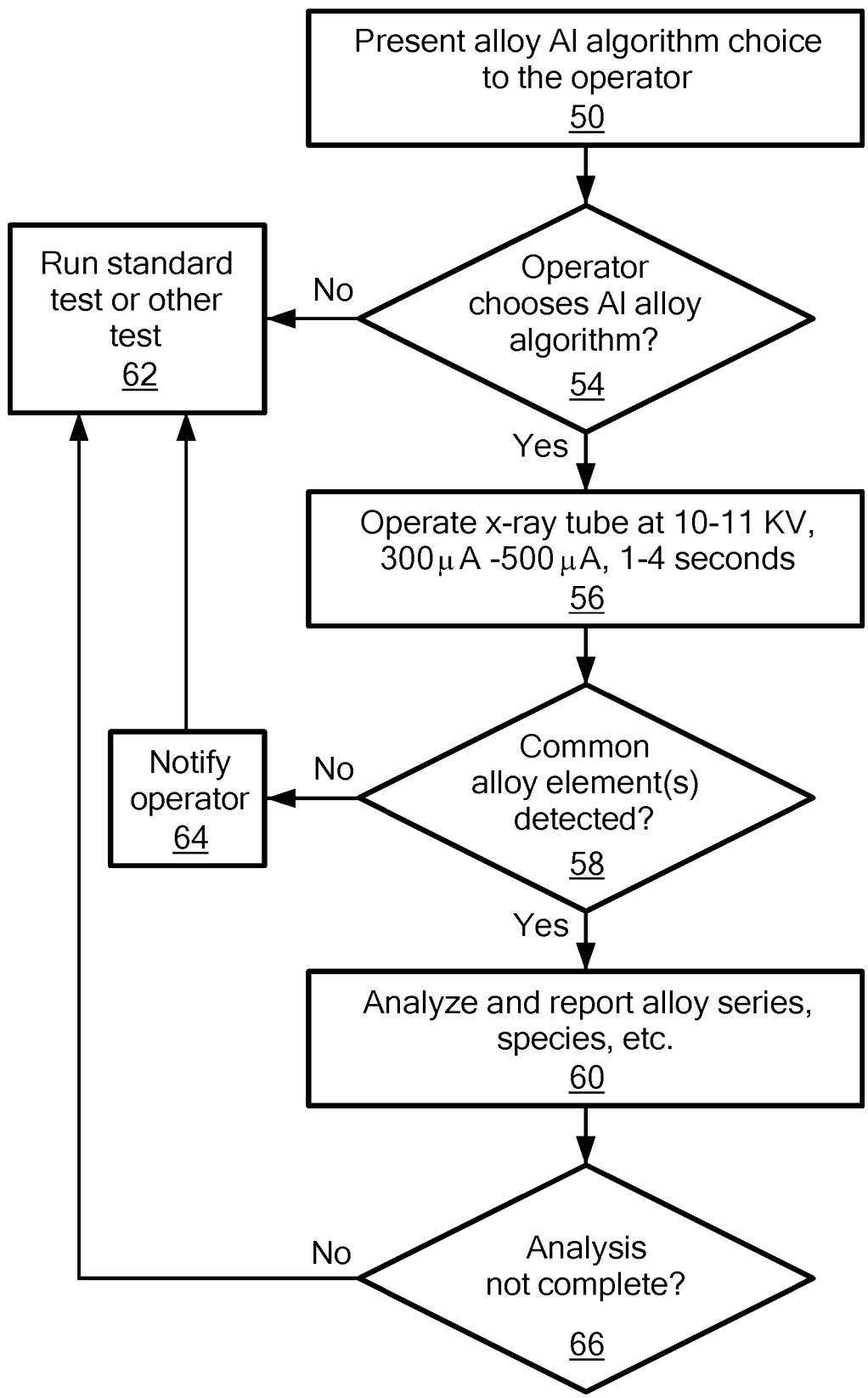
FIG. 4 is a flow chart depicting an example of the primary steps associated with the programming of the controller subsystem shown in FIGS. 2 and 3 and also showing the primary steps associated with an exemplary method in accordance with the invention.
Figure 5:
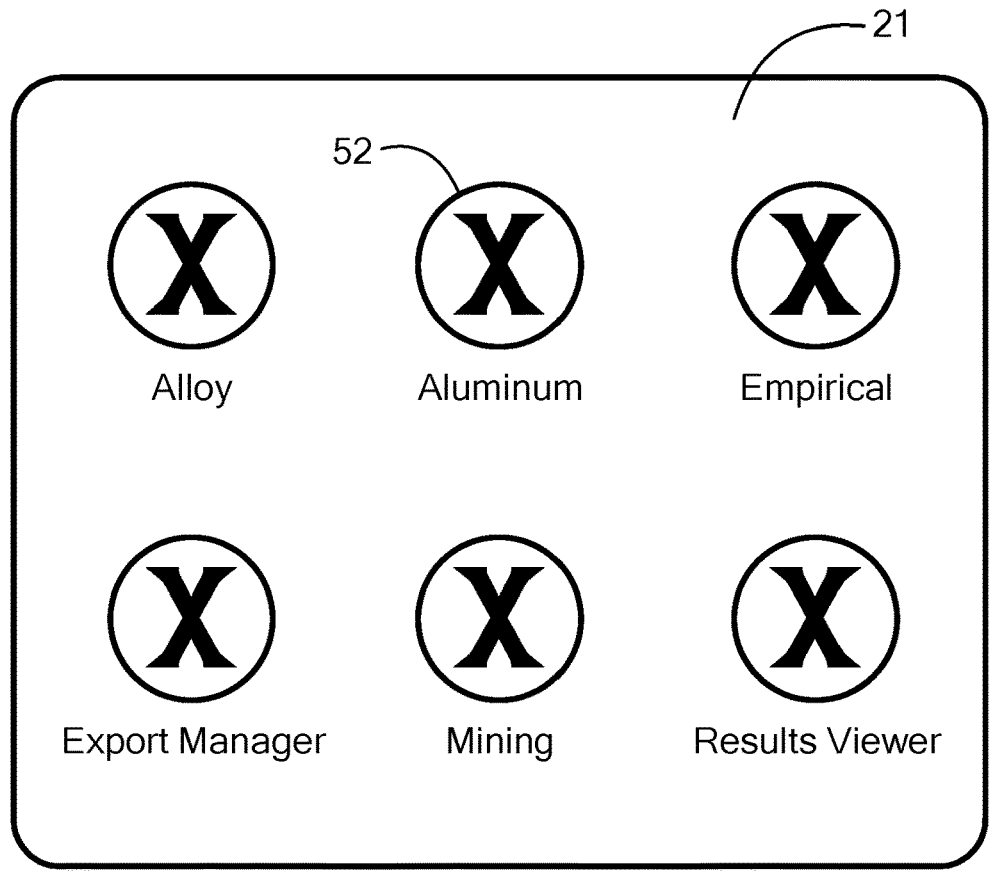
FIG. 5 is a view of the input/output (I/O) section touch screen of the XRF analyzer of FIG. 1 showing test choices available for user selection.

Controller subsystem 20 is configured (e.g., programmed) to present to the user on the I/O section a choice to invoke an aluminum alloy algorithm, step 50, FIG. 4. As shown in FIG. 5, the user may touch the virtual "aluminum" button 52 as a choice when the user believes the sample being analyzed is an aluminum alloy. In other examples, the I/O section may include actual buttons, switches, voice activated command technology, and the like.

In one example, when the user chooses the aluminum alloy algorithm, step 54, FIG. 4, the controller subsystem automatically invokes the aluminum alloy algorithm test and sets the X-ray tube voltage level at 10-11 kV, sets the X-ray current level at 300-500 µA, and sets the filter position to employ no filter at all or a blank filter for the X-ray beam. Other filters may be used, however, aluminum, silver, and the like of various thicknesses. These voltage and current levels are usually sufficient to quickly detect common elements (and their concentrations) present in most aluminum alloys. These common aluminum alloy elements may include magnesium, aluminum, and silicon, but also may include elements of the periodic table including Ti, V, Cr, Mn, Fe, Ni, Cu, Zn. The X-ray tube may be operated at this level, step 56, for 1 to 4 seconds to analyze the individual fluoresced energies detected.

Figure 6:
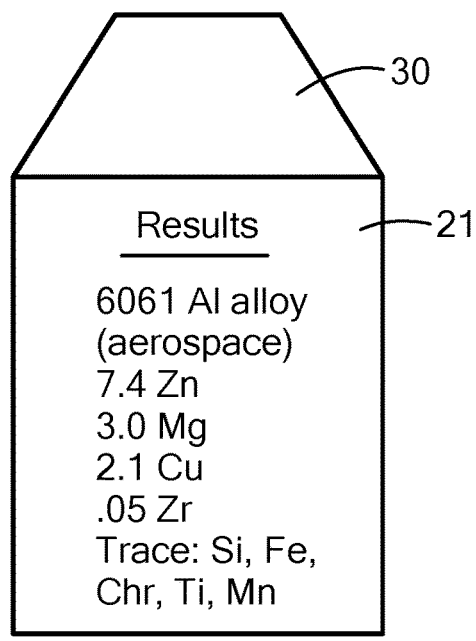
FIG. 6 is a view of the touch screen now showing an analysis report.

The controller subsystem is responsive to the output of the detector subsystem and, if the common aluminum alloy elements are detected, step 58, the specific alloy series and/or species are resolved and reported, step 60 as show in FIG. 6. Libraries of various aluminum alloys and their make-up may be stored in one or more memories associated with the controller subsystem may be used and compared to the elements and their concentrations detected in the sample.

Usually, this fast test is sufficient for most aluminum alloys. For example, the 6061 aluminum alloy sample reported in FIG. 6 includes, besides a high concentration of aluminum, also magnesium, copper, chromium, silicon and iron. Trace elements titanium and manganese were also detected and reported.

If the operator does not choose the aluminum alloy algorithm test, a standard test may be invoked by the controller subsystem as shown as step 62. For example, the standard test may involve operating the X-ray tube first at a high voltage, low current level setting (e.g., 40 kV, 30 µA) to detect and quantify elements with an atomic number greater than zinc. Then, a second test at the low voltage, high current level (e.g., 10-11 kV, 300-500 µA) level settings is performed to detect elements ranging from magnesium to zinc on the periodic table with an analysis of detected elements performed at each setting. This is typically called the dual-beam test.

Also, at step 58 if the common aluminum alloy elements are not detected using the aluminum alloy algorithm test, the operator may be notified via the I/O section as shown at step 64 and/or the standard dual-beam test is automatically executed at step 62.

In some cases, the aluminum alloy algorithm test may not be able to specify a particular aluminum alloy between several possible aluminum alloys. For example, the X-ray tube operated at 10-11 kV and 300-500 µA for 1 to 4 seconds may not be able to reliably detect and quantify certain elements such as zirconium, lead, bismuth, silver, tin, and/or cadmium. One particular aluminum alloy, for example, may differ from another aluminum alloy only by different concentrations of one or more of these elements. So, if the controller subsystem analysis is not able to specify a particular aluminum alloy between two or more possible aluminum alloy matches as shown at step 66, the controller subsystem may automatically adjust the X-ray tube to the high voltage (e.g., 40 kV), low current (e.g., 30 µA) beam condition which is ideal for measuring these transition or heavy elements. The filter wheel may be adjusted to employ, for example, a 1 mm thick silver filter.

In one example, one difference between a 6061 alloy and a 6040 alloy is the presence of 0.3-1.2% tin (Sn) in the 6040 alloy. Accordingly, the low voltage, high current test will report that the sample is an aluminum alloy and the high voltage, low current test will accurately report that the aluminum alloy is the 6040 series alloy by detecting the presence of tin in the sample.

FIG. 5 further shows virtual buttons for an "alloy test". Upon the user selecting this test, the controller subsystem automatically executes the standard dual beam test shown at step 62, FIG. 4. If the user selects the "empirical" test shown in FIG. 5, the controller subsystem allows the user to set customized X-ray current and voltage levels and filter materials to run a customized test using the user's calibration data uploaded into the analyzer. The "mining" test shown in FIG. 5 typically involves the standard dual beam test but using different processing parameters. Although used less often, a test for magnesium alloys and zinc alloys may be performed using the same processing shown in FIG. 4. Other tests are possible (e.g., three beam tests).

The result is a portable hand held XRF analyzer and method wherein the user is presented with a number of possible tests to run and in which, when the aluminum alloy algorithm test is selected and performed, results in a much faster response time for many aluminum alloys. In the case of the method disclosed here, we take advantage of the realization that there is a narrow range of tube parameter settings whereby nearly all aluminum and magnesium alloys can be analyzed with both speed and precision, with a single beam, without overwhelming the detector with count rate.

In one example, controller subsystem 20 is programmed as follows. When the user chooses aluminum app, FIG. 5 on the home screen, the Aluminum Application begins and the controller subsystem 20, FIG. 2 sets tube voltage to 10.5 kV, sets tube current to 500 uA, and sets filter position to position "1" (e.g., a blank filter) (no filter material filter).

These settings allow analyzer to measure elements Al, Mg, Si, Ti, V, Cr, Mn, Fe, Ni, Cu and Zn without overwhelming the detector. If the elements shown can be measured, it is possible to uniquely identify about 90% of all Al alloys. Note this is the exact opposite of what every other XRF analyzers do when testing Al alloys. This new technique may reduce testing time by 2-10 sec of testing time. When the user pulls the trigger of the hand held device, the software acquires a spectrum after 1-2 seconds and integrates peaks in spectrum corresponding to elements Al, Si, Mg, Cr, Fe, Ni, Cu and Zn for total intensity (X-ray counts). The algorithm divides the X-ray counts by the detector live time to yield count rates for the above elements and calculates a ratio R=(Al+Si+Mg rates)/(all other elements). All other elements preferably means Ti, V, Cr, Mn, Fe, Co, Ni, Cu, Zn, W, Ta, Hf, Re, Zr, Nb, Mo, Sn, Ag, Au, Pb, Pd.

If R>1, then the algorithm performs a fundamental parameters calculation to determine chemistry values for Al, Si, Mg, Ti, V, Cr, Mn, Fe, Ni, Cu and Zn. The algorithm checks a library of Al alloy grade specifications and if a matching grade (or grades) indicate a $2^{nd}$ test is not required. Then the alloy grade name and alloy chemistry are displayed.

If a second test is required, then the algorithm sets the tube voltage to 40 kV, sets tube current to 30 uA (note >10× lower than first test, to avoid swamping detector), and sets the filter wheel to position F0 (e.g., a 1 mm thick silver filter). These settings are optimal for measuring other possible alloy elements in the alloy, specifically Zr, Ag, Sn, Bi, Pb in one example. 1-2 seconds of spectral data are collected and the area under the peaks are integrated for the above elements to determine total intensity. Then, divide by livetime to determine count rates of elements. The fundamental parameters algorithm routine uses this data to determine concentrations of the above elements plus elements detected from the first low voltage settings. One or more Aluminum alloy libraries are searched to determine matching grade and then the grade and chemistry of the aluminum alloy are displayed.

The following steps are preferably executed by the controller subsystem computer instructions if the material tested is not an Al or Mg alloy (e.g., R<1). Change the tube voltage to 40 kV, change the tube current to 30 uA, move filter wheel to position 0 (e.g., a 1 mm thick silver filter), acquire spectral data for 1 second and integrate the area under peaks to determine total counts for elements T, V, Cr, Mn, Fe, Co, Ni, Cu, Zn, Se, As, W, Ta, Re, Hf, Pb, Bi, Y, Zr, Nb, Mo, Pd, Ag, Sn, and Sb. Divide each area by live time to calculate rates for each element, and pass the rates into a fundamental parameters routine to get concentration values of each element. Check library of alloy grade specifications to determine which alloys match the chemistry.

If the matching alloys are marked as "2-beam grades" then change the tube voltage to 8 kV, change the tube current to 500 uA, change the filter wheel to position F1 (e.g., a 25 micron thick aluminum filter), perform the analysis for elements Mg, Al, Si, P and S for 2-10 seconds depending on operator setting, determine total counts of Mg, Al, Si, P and S by integrating peak area for each element, and divide total counts by live time to determine count rates (intensities) for each element, pass these rates to the fundamental parameters routine to determine concentrations of Mg, Al, Si, P and S in addition to above elements, and show (display) the matching alloy grade and alloy chemistry.

If the matching alloys are not marked as "2-beam grades", then display the alloy chemistry and grade.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A portable hand held XRF analyzer comprising:
an I/O section;
an X-ray source for directing X-rays to a sample;
a detector for detecting photons emitted by the sample; and
a controller subsystem controlling the X-ray source and I/O section and responsive to the detector and I/O section, the controller subsystem configured to:
present to the user via the I/O section a choice to invoke an aluminum alloy algorithm test, as well as one or more additional tests,
automatically first invoke the aluminum alloy algorithm test if the operator chooses the aluminum alloy algorithm test,
automatically first operate the X-ray source at a predetermined voltage level and predetermined current level optimized for detecting aluminum alloy elements and
automatically analyze the detector output based only on stored libraries of aluminum alloys to determine aluminum alloy elements and their concentrations present in the sample.

2. The analyzer of claim 1 in which the aluminum alloy algorithm test is configured to automatically set the predetermined voltage level at 10-11 kV and the predetermined current level at 300-500 µA.

3. The analyzer of claim 1 in which the controller subsystem is further configured to operate the X-ray source at a higher voltage and lower current level if one or more aluminum alloy elements are not detected.

4. The analyzer of claim 3 in which the higher voltage level is 40-50 kV and the lower current level is 10-30 µA.

5. The analyzer of claim 3 in which the controller subsystem is further configured to present to the user on the I/O section a choice to operate the X-ray source at the higher voltage, lower current level.

6. The analyzer of claim 1 in which the controller subsystem is further configured, if the analysis fails to specify an aluminum alloy, to automatically operate the X-ray source at a higher voltage level and lower current level to detect one or more additional aluminum alloy elements present in the sample in order to detect a particular aluminum alloy.

7. The analyzer of claim 6 in which the higher voltage level is 40-50 kV and the lower current level 10-30 µA.

8. An XRF analysis method comprising:
offering a user a choice to invoke an aluminum alloy algorithm test and one or more additional tests;
invoking the aluminum alloy algorithm test first in response to user input;
operating the X-ray source at a predetermined voltage level and a predetermined current level optimized to detect aluminum alloy elements to direct X-rays at a sample;
detecting aluminum alloy elements in the sample; and
evaluating the detected aluminum alloy elements present in the sample using only stored libraries of aluminum alloys and reporting a specific aluminum alloy for the sample.

9. The method of claim 8 in which the predetermined voltage level is 10-11 kV and the predetermined current level is 300-500 µA.

10. The method of claim 8 further including operating the X-ray source at a higher voltage level if one or more aluminum alloy elements are not detected.

11. The method of claim 8 further including, if a specific aluminum alloy cannot be identified, operating the X-ray source at a higher voltage level and lower current level to detect one or more additional aluminum alloy elements present in the sample in order to specify the specific aluminum alloy.

12. A portable hand held XRF analyzer comprising:
an I/O section;
an X-ray source for directing X-rays to a sample;
a detector for detecting photons emitted by the sample; and
a controller subsystem controlling the X-ray source and I/O section and responsive to the detector and I/O section, the controller subsystem configured to:
present to the user via the I/O section a choice to invoke an aluminum alloy algorithm test,
automatically first invoke the aluminum alloy algorithm test if the operator chooses the aluminum alloy algorithm test,
automatically first operate the X-ray source at a predetermined voltage level and predetermined current level optimized to detect aluminum alloy elements,
automatically analyze the detector output based only on stored libraries of aluminum alloys to determine aluminum alloy elements and their concentrations present in the sample, and
only if the analysis fails to detect one or more aluminum alloy elements present in the sample and/or fails to specify a particular aluminum alloy, then to automatically operate the X-ray source at a higher voltage and lower current level and repeat the analysis step.

13. The analyzer of claim 12 in which the aluminum alloy algorithm test is configured to automatically set the predetermined voltage level at 10-11 kV and the predetermined current level at 300-500 µA.

14. The analyzer of claim 12 in which the controller subsystem is further configured to present to the user on the I/O section one or more additional choices to invoke other tests.

15. The analyzer of claim 12 in which the higher voltage level is 40-50 kV and the lower current level 10-30 µA.

16. An XRF analysis method comprising:

offering a user a choice to invoke an aluminum alloy algorithm test;

automatically first invoking the aluminum alloy algorithm test in response to user input;

automatically operating the X-ray source at a predetermined voltage level and a predetermined current level to direct X-rays at a sample optimized for detecting aluminum alloy elements;

automatically detecting aluminum alloy elements in the sample;

automatically analyzing the detected aluminum alloy elements present in the sample based only on stored libraries of aluminum alloys; and only if the analysis fails to detect one or more aluminum alloy elements present in the sample and/or fails to detect a particular aluminum alloy, then to automatically operate the X-ray source at a higher voltage, lower current level.

\* \* \* \* \*